(12) United States Patent
Cho et al.

(10) Patent No.: US 12,390,068 B2
(45) Date of Patent: Aug. 19, 2025

(54) CLEANER

(71) Applicant: SAMSUNG ELECTRONICS CO., LTD., Suwon-si (KR)

(72) Inventors: Youngjun Cho, Suwon-si (KR); Ohkyu Kwon, Suwon-si (KR); Seongtae Chu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 354 days.

(21) Appl. No.: 18/070,762

(22) Filed: Nov. 29, 2022

(65) Prior Publication Data

US 2023/0092045 A1 Mar. 23, 2023

Related U.S. Application Data

(63) Continuation of application No. PCT/KR2021/006469, filed on May 25, 2021.

(30) Foreign Application Priority Data

Jul. 17, 2020 (KR) .................. 10-2020-0089008

(51) Int. Cl.
*A47L 9/14* (2006.01)
*A47L 5/28* (2006.01)
(Continued)

(52) U.S. Cl.
CPC .................. *A47L 9/149* (2013.01); *A47L 5/28* (2013.01); *A47L 9/12* (2013.01); *A47L 9/1409* (2013.01);
(Continued)

(58) Field of Classification Search
CPC .............. A47L 9/149; A47L 5/28; A47L 9/12; A47L 9/1409; A47L 9/1683; A47L 9/22;
(Continued)

(56) References Cited

U.S. PATENT DOCUMENTS

| 6,108,864 A | 8/2000 | Thomas et al. |
| 9,521,936 B2 | 12/2016 | Holz |
| 2019/0167058 A1* | 6/2019 | Cho ........................ A47L 9/104 |

FOREIGN PATENT DOCUMENTS

| CA | 2 292 317 A1 | 2/2001 |
| DE | 10 2013 101 809 A1 | 8/2014 |

(Continued)

OTHER PUBLICATIONS

Communication from European Patent Office dated Feb. 20, 2024 for corresponding European application 21841980.2.
International Search Report dated Sep. 17, 2021 for International Application No. PCT/KR2021/006469.
(Continued)

*Primary Examiner* — Andrew A Horton
(74) *Attorney, Agent, or Firm* — STAAS & HALSEY LLP

(57) ABSTRACT

A cleaner comprises a housing having a dust collection chamber formed in the housing and configured to open and close, a main body movable relative to the housing between a first position whereby the main body closes the dust collection chamber and a second position whereby the main body opens the dust collection chamber, and a motor filter mountable to and demountable from the main body, wherein the main body includes a fan motor unit to generate a suction force, and a shutter device mountable into the main body and configured to open and close a flow path between the motor filter and the fan motor unit.

15 Claims, 14 Drawing Sheets

(51) Int. Cl.
    *A47L 9/12*     (2006.01)
    *A47L 9/16*     (2006.01)
    *A47L 9/22*     (2006.01)
    *A47L 9/28*     (2006.01)
    *B01D 46/00*     (2022.01)

(52) U.S. Cl.
    CPC ............... *A47L 9/1683* (2013.01); *A47L 9/22* (2013.01); *A47L 9/2821* (2013.01); *A47L 9/2831* (2013.01); *A47L 9/2842* (2013.01); *B01D 46/0002* (2013.01); *B01D 46/0049* (2013.01); *B01D 2273/30* (2013.01)

(58) Field of Classification Search
    CPC .... A47L 9/2821; A47L 9/2831; A47L 9/2842; B01D 46/0002; B01D 46/0049; B01D 2273/30
    See application file for complete search history.

(56) References Cited

FOREIGN PATENT DOCUMENTS

| | | |
|---|---|---|
| DE | 10 2016 124 786 A1 | 7/2017 |
| EP | 2 064 980 B1 | 3/2013 |
| JP | 2004-298495 | 10/2004 |
| KR | 10-1012197 | 2/2011 |
| KR | 10-1411711 | 6/2014 |
| KR | 10-2019-0024195 | 3/2019 |
| KR | 10-2019-0066239 | 6/2019 |
| WO | WO 2008/023474 A1 | 2/2008 |

OTHER PUBLICATIONS

Written Opinion of the International Searching Authority dated Sep. 17, 2021 for International Application No. PCT/KR2021/006469.
European Search Report dated Aug. 7, 2023 in European Patent Application No. 21841980.2.

\* cited by examiner

CLEANER

CROSS-REFERENCE TO RELATED APPLICATION

This application is a continuation application, under 35 USC § 111(a), of International Application No. PCT/KR2021/006469, filed on May 25, 2021, which claims priority to Korean Patent Application No. 10-2020-0089008, filed on Jul. 17, 2020, in the Korean Intellectual Property Office, the disclosures of which are incorporated by reference herein in their entirety.

BACKGROUND

1. Field

The present disclosure relates to a cleaner, and more particularly, to a cleaner with an improved structure.

2. Description of Related Art

Cleaners are devices that remove rubbish from indoors to clean an indoor space, and generally, vacuum cleaners are commonly used in households. Vacuum cleaners suction air using the suction force of a fan motor unit and then separate rubbish from the suctioned air using a device such as a filter to clean an indoor space. Such vacuum cleaners include a canister type and an upright type. In recent years, robot vacuums that perform a cleaning task by autonomously traveling around a cleaning area without a user's manipulation and suctioning rubbish such as dust from a surface to be cleaned have become popular.

A vacuum cleaner includes a dust collection device therein so that rubbish is filtered by a predetermined filtering device in order to filter rubbish included in suctioned air. Examples of the filtering device that allows rubbish to be filtered in the dust collection device include a porous filter device which allows rubbish to be forcibly filtered as air passes through a porous filter and a cyclone-type dust collection device which allows rubbish to be filtered during a cyclonic flow of air.

In the vacuum cleaner, rubbish such as human hair or animal hair gets tangled in the dust collection device in the process of being filtered, and a user has to directly separate such rubbish from the dust collection device. Thus, it is unsanitary and inconvenient to use.

SUMMARY

In accordance with one aspect of the present disclosure, a cleaner includes a housing having a dust collection chamber formed in the housing and configured to open and close, a main body movable relative to the housing between a first position whereby the main body closes the dust collection chamber and a second position whereby the main body opens the dust collection chamber, and a motor filter mountable to and demountable the main body, wherein the main body includes a fan motor unit to generate a suction force and a shutter device mountable into the main body and configured to open or close a flow path between the motor filter and the fan motor unit.

The shutter device may be configured to open the flow path between the motor filter and the fan motor unit while the motor filter is mounted into the main body and close the flow path between the motor filter and the fan motor unit while the motor filter is demounted from the main body.

The shutter device may include a shutter door and an elastic body to support the shutter door at a position at which the shutter door closes the flow path between the motor filter and the fan motor unit.

The shutter door may include a lever to be pressed by the motor filter.

The main body may include a filter case couplable to and decouplable from the fan motor unit and in which the motor filter is mountable to and demountable from the filter case.

The cleaner may further include a sensor to detect whether the flow path between the motor filter and the fan motor unit is blocked and a controller provided to receive information from the sensor and control the fan motor unit.

The fan motor unit may include a fan motor, the sensor measures revolutions per minute of the fan motor, and the controller is configured to stop the fan motor in response to the revolutions per minute of the fan motor measured by the sensor being higher than a predetermined revolutions per minute.

The sensor measures a flow rate of air passing through the fan motor unit, and the controller may be provided to stop the fan motor in response to the flow rate of the air measured by the sensor being lower than a predetermined flow rate.

The sensor measures a vacuum level inside the fan motor unit, and the controller configured to stop the fan motor in response to the vacuum level of the fan motor unit measured by the sensor being higher than a predetermined vacuum level.

The controller may be disposed on one end of the fan motor unit that is opposite to one end of the fan motor unit where the shutter device is disposed.

The main body may include a rubbish removal member movable in the dust collection chamber and an opening/closing device to open or close the dust collection chamber and configured to operate in conjunction with the rubbish removal member.

The dust collection chamber may be a first dust collection chamber, the main body may include a rubbish separation device provided to remove rubbish from air which has passed through the first dust collection chamber, and a second dust collection chamber in which rubbish separated from the rubbish separation device is collected inside the housing.

The rubbish removal member may be a first rubbish removal member, and the main body may include a second rubbish removal member to slide in the second dust collection chamber and the first dust collection chamber to discharge rubbish from the second dust collection chamber while the main body moves from the first position to the second position.

The rubbish separation device may be disposed on one side of the motor filter, and the fan motor unit may be disposed on another side of the motor filter that is opposite to the one side.

The second dust collection chamber may be disposed a side of the rubbish separation device that is opposite to one side of the rubbish separation device where the motor filter is disposed, and the first dust collection chamber may be disposed on another side of the second dust collection chamber that is opposite to one side of the second dust collection chamber where the rubbish separation device is disposed.

In accordance with another aspect of the present disclosure, a cleaner includes a housing having a dust collection chamber provided therein, a main body provided to be movable relative to the housing between a first position closing the dust collection chamber and a second position opening the dust collection chamber, and a motor filter detachably mounted in the main body, wherein the main body includes a filter case provided so that the motor filter is mounted therein, a fan motor unit provided to generate suction force, and a shutter device provided to allow the filter case and the fan motor unit to communicate while the motor filter is mounted in the filter case and partition the filter case and the fan motor unit from each other while the motor filter is separated from the filter case.

The cleaner may further include a sensor provided to detect whether the filter case and the fan motor unit communicate and a controller provided to receive information from the sensor and control the fan motor unit.

The sensor may be provided to measure a driving state of a fan motor disposed in the fan motor unit or measure an internal state of the fan motor unit.

The shutter device may include a shutter opening provided to be able to communicate with the filter case and a shutter door provided to close the shutter opening while the filter case is separated from the fan motor unit.

The shutter device may include an elastic body provided to press the shutter door in a direction in which the shutter door closes the shutter opening.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
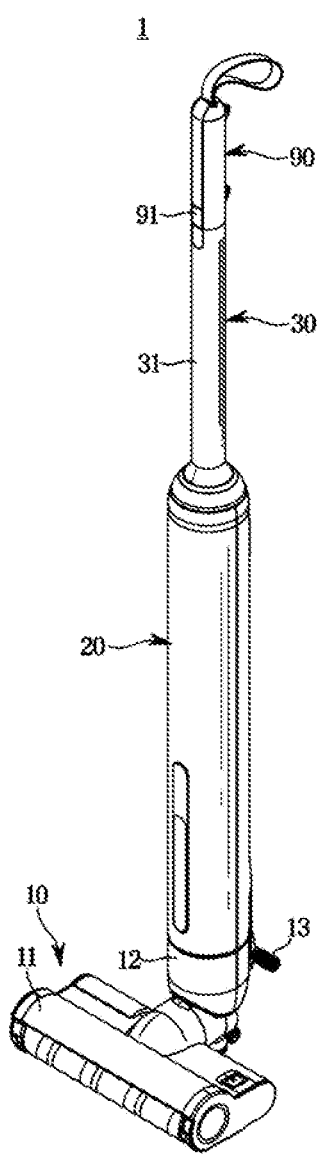
FIG. 1 is a perspective view of a cleaner according to one embodiment of the present disclosure.

Embodiments described herein and configurations illustrated in the drawings are merely exemplary embodiments of the present disclosure, and various modifications which may replace the embodiments and the drawings herein may be present at the time of filing this application.

Like reference numerals or symbols presented in each drawing herein indicate parts or elements that perform substantially the same functions.

Terms used herein are for describing the embodiments and are not intended to limit and/or restrict the disclosure. A singular expression includes a plural expression unless context clearly indicates otherwise. In the application, terms such as "include" or "have" should be understood as designating that features, number, steps, operations, elements, parts, or combinations thereof are present and not as precluding the possibility of the presence or addition of one or more other features, numbers, steps, operations, elements, parts, or combinations thereof in advance.

Terms including ordinals such as first and second may be used herein to describe various elements, but the elements are not limited by the terms. The terms are only used for the purpose of distinguishing one element from another element. For example, a first element may be referred to as a second element while not departing from the scope of the present disclosure, and likewise, a second element may also be referred to as a first element. The term "and/or" includes a combination of a plurality of associated listed items or any one item among the plurality of associated listed items.

It is an aspect of the present disclosure to provide a cleaner allowing rubbish collected in a dust collection chamber to be easily discharged.

It is another aspect of the present disclosure to provide a cleaner preventing damage to a fan motor unit due to an erroneous operation.

According to one aspect of the present disclosure, since a cleaner is provided so that a dust collection chamber is opened or closed as a main body slides relative to a housing, rubbish collected in the dust collection chamber can be easily discharged.

According to one aspect of the present disclosure, since a cleaner is provided so that a shutter device is opened while a motor filter is mounted, damage to a fan motor unit due to an erroneous operation can be prevented.

Hereinafter, embodiments according to the present disclosure will be described in detail with reference to the accompanying drawings. In FIG. 1, a portion where a suction head 10 is disposed may be defined as the front, and a portion where a handle 90 is disposed may be defined as the rear. That is, air may be defined as being introduced through the front of a cleaner 1 and discharged through the rear. However, the shape and position of each element are not limited by the terms defined as above.

Figure 2:
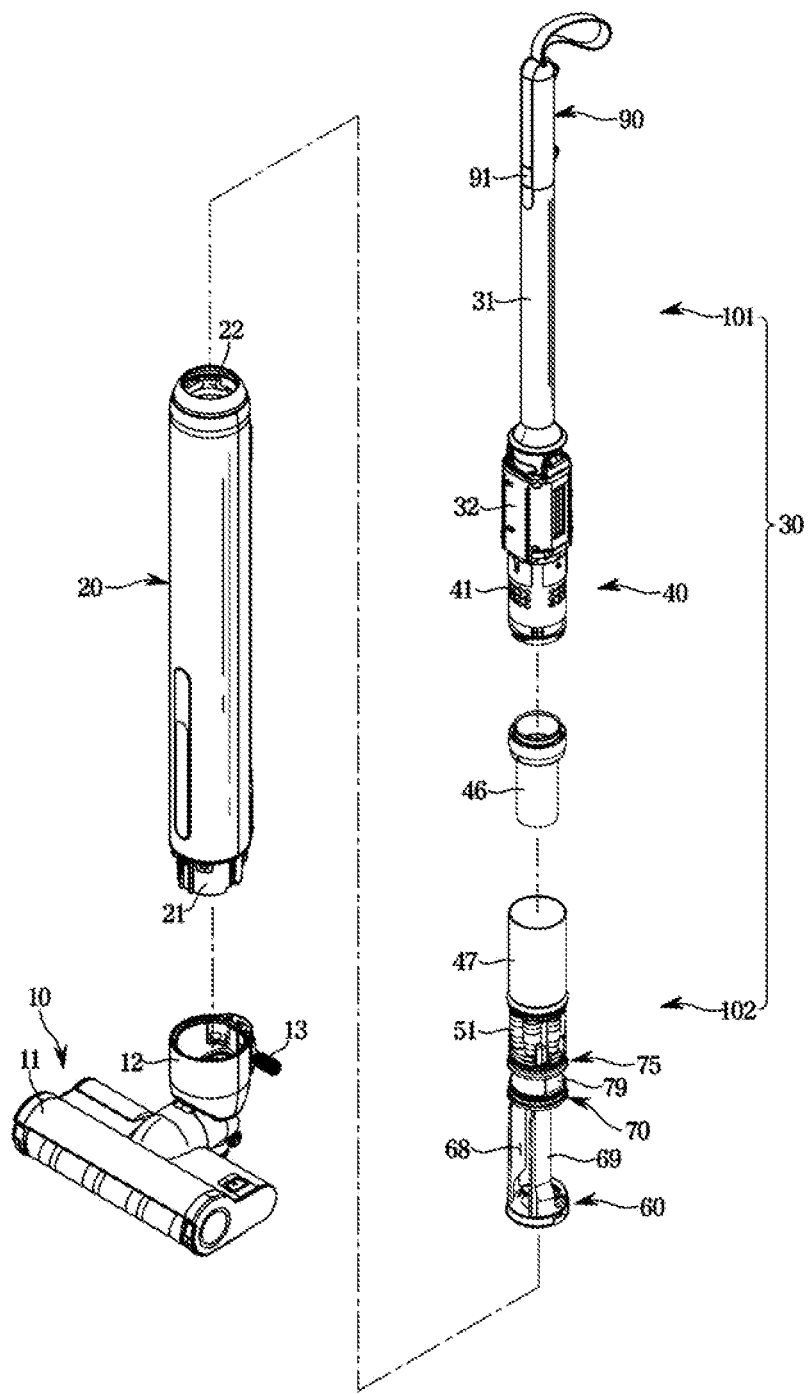
FIG. 2 is an exploded view of the cleaner illustrated in FIG. 1.
Figure 3:
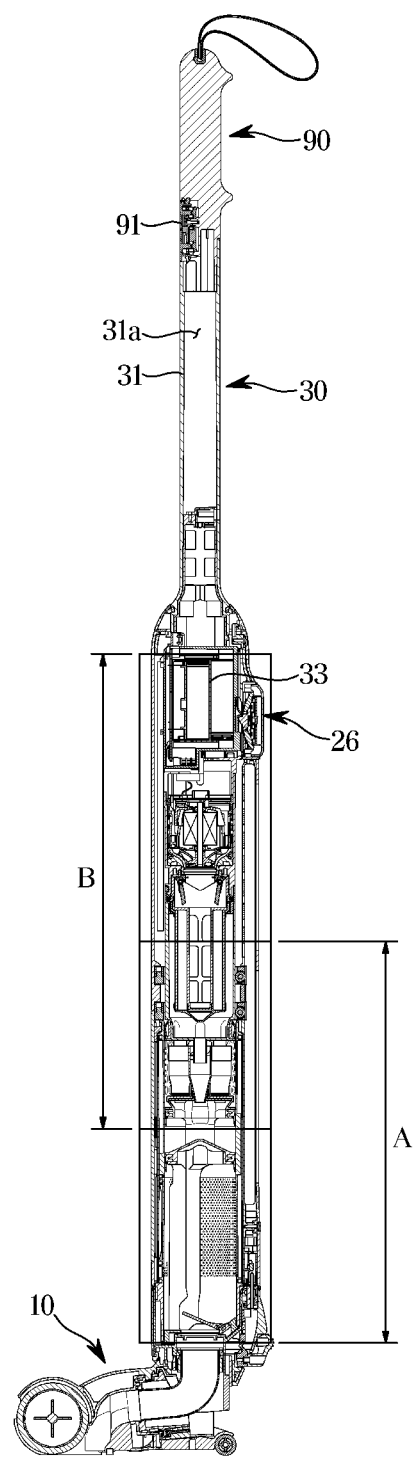
FIG. 3 is a cross-sectional view of the cleaner illustrated in FIG. 1.
Figure 4:
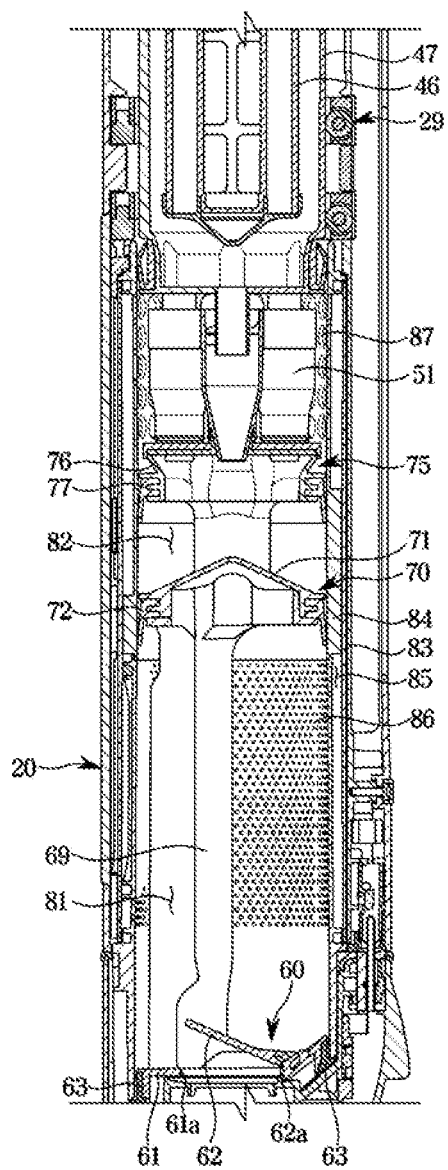
FIG. 4 is an enlarged view of portion A shown in FIG. 3.
Figure 5:
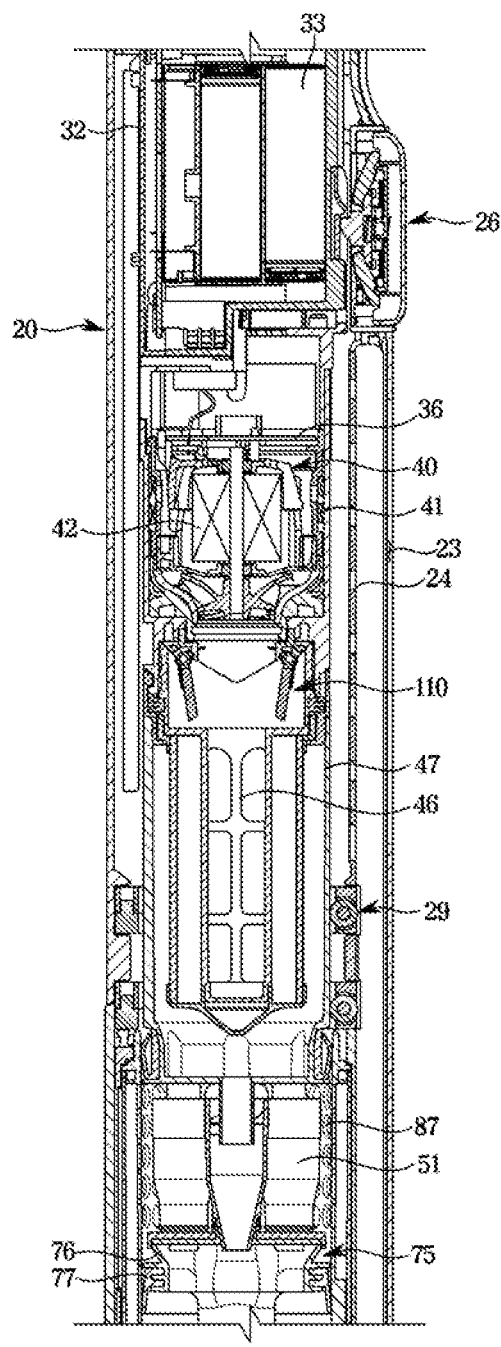
FIG. 5 is an enlarged view of portion B shown in FIG. 3.
Figure 6:
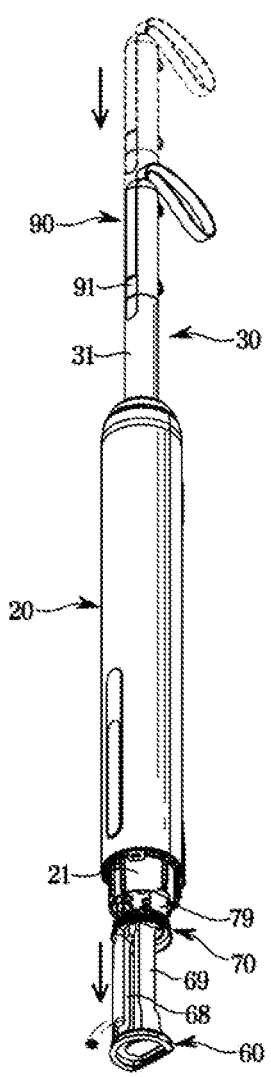
FIG. 6 is a view illustrating a state in which dust is emptied from the cleaner illustrated in FIG. 1.

FIG. 1 is a perspective view of a cleaner according to one embodiment of the present disclosure. FIG. 2 is an exploded view of the cleaner illustrated in FIG. 1. FIG. 3 is a cross-sectional view of the cleaner illustrated in FIG. 1. FIG. 4 is an enlarged view of portion A shown in FIG. 3. FIG. 5 is an enlarged view of portion B shown in FIG. 3. FIG. 6 is a view illustrating a state in which dust is emptied from the cleaner illustrated in FIG. 1.

Referring to FIGS. 1 and 2, the cleaner 1 may include the suction head 10 provided to, using suction force of air, suction rubbish such as human hair from a surface to be cleaned, a housing 20 connected to the suction head 10, and a main body 30 movably provided inside the housing 20.

The suction head 10 is provided to suction rubbish, such as dust present on a surface to be cleaned, while moving on the surface to be cleaned. The suction head 10 may include a head assembly 11, a neck portion 12, and a head switch 13.

An air flow path may be formed inside the head assembly 11. The air flow path formed inside the head assembly 11 may communicate with the housing 20 through the neck portion 12. Outside air and rubbish introduced through the head assembly 11 may move into the housing 20 through the neck portion 12.

The neck portion 12 may be connected to a lower end portion of the housing 20. The neck portion 12 may be rotatably coupled to the head assembly 11. As the neck portion 12 rotates relative to the head assembly 11, the head assembly 11 may rotate relative to the housing 20 connected to the neck portion 12. Accordingly, a degree of freedom of driving the cleaner 1 can be improved.

The head switch 13 is provided to fix or release a coupling state between the suction head 10 and the housing 20. A user may operate the head switch 13 to separate the housing 20 from the suction head 10. As the head switch 13 is disposed on the suction head 10, the user may separate the housing 20 from the suction head 10 by operating the head switch 13 using his or her foot without bending the waist.

The housing 20 may form a portion of an exterior of the cleaner 1. The housing 20 may have one end portion 21 mounted on the suction head 10. The housing 20 may include a hollow 22 formed so that the main body 30 is movably inserted thereinto.

Referring to FIGS. 3 and 5, a button device 26 configured to fix the position of the main body 30 relative to the housing 20 may be provided in the housing 20. By operating the button device 26 and releasing the main body 30 from the housing 20, a user may move the main body 30 relative to the housing 20.

The main body 30 may be slidably coupled to the housing 20. The main body 30 may be provided to be movable relative to the housing 20 between a first position at which the main body 30 closes dust collection chambers 81 and 82 and a second position at which the main body 30 opens the dust collection chambers 81 and 82.

A guide device 29 may be provided between the housing 20 and the main body 30. The guide device 29 may guide and support movement of the main body 30 relative to the housing 20.

The main body 30 may include an extension 31 forming a portion of the exterior of the cleaner 1. A space 31a configured to accommodate a wire which extends toward a manipulation switch 91 may be formed inside the extension 31.

The handle 90 may be disposed on a rear end portion of the extension 31. The handle 90 may be disposed on the other end of the main body 30 that is opposite to one end of the main body 30 where an opening/closing device 60 is disposed. A user may push or pull the suction head 10 while holding the handle 90 when using the cleaner 1.

The manipulation switch 91 for controlling an operation of the cleaner may be provided in the handle 90. The manipulation switch 91 is provided to receive a command for operating the cleaner 1 from a user. The manipulation switch 91 may be disposed adjacent to the handle 90 so that, when cleaning, the user may operate the cleaner 10 while moving the cleaner 1.

The main body 30 may include a battery mounting portion 32. A battery 33 may be mounted on the battery mounting portion 32. The battery 33 may be provided as a single battery or two or more batteries. The battery mounting portion 32 may be disposed inside the housing 20.

A fan motor unit 40 configured to generate suction force necessary for suctioning rubbish from a surface to be cleaned may be provided in the main body 30. The fan motor unit 40 may be configured to cause outside air to be introduced through the suction head 10 and discharged through exhaust ports 23 and 24 of the housing 20. The fan motor unit 40 may be disposed inside the housing 20 while mounted in the main body 30. The fan motor unit 40 may include a fan motor 42.

Referring to FIGS. 2 to 4, while the main body 30 is coupled to the housing 20, a first dust collection chamber 81 and a second dust collection chamber 82 may be formed in the cleaner 1. Specifically, while the main body 30 is at the first position relative to the housing 20, the first dust collection chamber 81 and the second dust collection chamber 82 may be formed in the cleaner 1.

An outer case 83 forming the dust collection chambers 81 and 82 and an inner case 84 disposed inside the outer case 83 may be provided inside the housing 20. The outer case 83 may be disposed between the housing 20 and the inner case 84.

The outer case 83 may form a case flow path 85 together with the inner case 84. The case flow path 85 may guide air, which has passed through the first dust collection chamber 81, to the second dust collection chamber 82.

The inner case 84 may be disposed inside the outer case 83. The first dust collection chamber 81 may be formed inside the inner case 84. A filtering device 86 may be provided in the inner case 84. The first dust collection chamber 81 may collect rubbish filtered while air introduced through the suction head 10 passes through the filtering device 86.

The filtering device 86 may primarily filter rubbish from air introduced through the suction head 10. The filtering device 86 may extend along a portion of an inner side surface of the inner case 84. The rubbish filtered by the filtering device 86 may be collected in the first dust collection chamber 81. The filtering device 86 may be provided as a mesh member.

The inner case 84 may include a case opening 87 through which air guided through the case flow path 85 is introduced into a rubbish separation device 51.

Air introduced into the rubbish separation device 51 through the case opening 87 may be secondarily filtered in the rubbish separation device 51. Rubbish filtered by the rubbish separation device 51 may be collected in the second dust collection chamber 82. Air filtered in the rubbish separation device 51 may move toward a motor filter 46.

The main body 30 may include the opening/closing device 60 configured to open or close the first dust collection chamber 81. The opening/closing device 60 may be disposed on an end portion of the main body 30 that faces the suction head 10. The opening/closing device 60 may be configured to operate in conjunction with a first rubbish removal member 70 and a second rubbish removal member 75.

As the opening/closing device 60 operates in conjunction with the first rubbish removal member 70 and/or the second rubbish removal member 75, the first dust collection chamber 81 can be prevented from being opened unintentionally, and the dust collection chambers 81 and 82 can be opened only when it is attempted to discharge rubbish. The opening/closing device 60 may include an opening/closing member 61, an opening/closing cover 62, and an opening/closing sealing member 63.

The opening/closing device 60 may be provided to, in response to the first rubbish removal member 70 being withdrawn by sliding from the first dust collection chamber 81, move in a direction moving away from the housing 20 in order to open the first dust collection chamber 81. The opening/closing device 60 may be provided to, in response to the first rubbish removal member 70 being inserted by sliding to the first dust collection chamber 81, move in a direction approaching the housing 20 in order to close the first dust collection chamber 81.

The opening/closing member 61 may open or close the first dust collection chamber 81 as the main body 30 slides relative to the housing 20. The opening/closing member 61 may include a chamber inlet 61a formed so that air introduced from the suction head 10 is introduced into the first dust collection chamber 81. The chamber inlet 61a may be opened or closed by the opening/closing cover 62.

The opening/closing cover 62 may be configured to include an elastic material. The opening/closing cover 62 may open the chamber inlet 61a in a direction in which air is introduced into the first dust collection chamber 81. On the other hand, the opening/closing cover 62 may be provided to not open the chamber inlet 61a in a direction opposite to the direction in which air is introduced into the first dust collection chamber 81. That is, the opening/closing cover 62 may open the chamber inlet 61a while the cleaner 1 suctions rubbish from a surface to be cleaned but may not open the chamber inlet 61a in a direction in which dust is discharged from the first dust collection chamber 81. Accordingly, scattering of rubbish can be prevented during separation of the housing 20 from the suction head 10.

The opening/closing cover 62 may include a cover hinge portion 62a. While the fan motor unit 40 generates suction force, the opening/closing cover 62 may be elastically deformed and open the chamber inlet 61a in a state in which the cover hinge portion 62a is fixed. While the fan motor unit 40 does not generate suction force, the opening/closing cover 62 may return to a position closing the chamber inlet 61a due to an elastic force.

The opening/closing sealing member 63 may be provided to seal between the inner case 84 and the opening/closing member 61. The opening/closing sealing member 63 may be disposed along an edge of the opening/closing member 61. The opening/closing sealing member 63 may be configured to include an elastic material. The opening/closing sealing member 63 may be configured to include a material that is more flexible than the opening/closing member 61. The opening/closing sealing member 63 may seal the first dust collection chamber 81 while in close contact with the inner side surface of the inner case 84. Accordingly, the cleaner 1 according to one embodiment of the present disclosure can prevent rubbish from spilling from the first dust collection chamber 81.

The main body 30 may include the first rubbish removal member 70 provided to discharge rubbish from the first dust collection chamber 81. The first rubbish removal member 70 may be provided to slide in the first dust collection chamber 81. The first rubbish removal member 70 may include a first mounting portion 71 and a first rubbish remover 72 mounted on the first mounting portion 71.

The first rubbish remover 72 may be configured to include an elastic material. The first rubbish remover 72 may be formed to come in close contact with an inner wall of the filtering device 86. The first rubbish remover 72 may be provided to come in close contact with one surface of the filtering device 86 on which rubbish is filtered. While the main body 30 slides relative to the housing 20, the first rubbish remover 72 may slide in close contact with an inner surface of the filtering device 86. While the main body 30 slides into the housing 20, the first rubbish remover 72 may scratch an inner side surface of the filtering device 86 and remove rubbish, such as tangled human hair, from the inner side surface of the filtering device 86.

The first rubbish removal member 70 may move from a first position between the filtering device 86 and the rubbish separation device 51 to a second position at which the first rubbish removal member 70 protrudes to an outside of the housing 20. Accordingly, the first rubbish removal member 70 may discharge rubbish present in the first dust collection chamber 81 to the outside. Further, as the first rubbish removal member 70 protrudes to the outside of the housing 20, dust collected in the second dust collection chamber 82 may also be discharged to the outside.

The main body 30 may include a first connector 69 configured to connect the first rubbish removal member 70 and the opening/closing device 60. The first connector 69 may be disposed in the first dust collection chamber 81. The first rubbish removal member 70 and the opening/closing device 60 may operate in conjunction with each other by the first connector 69.

Referring to FIG. 6, a discharge opening 68 may be formed between a plurality of first connectors 69. The discharge opening 68 may be formed between the first rubbish removal member 70 and the opening/closing device 60. In response to the opening/closing device 60 opening the first dust collection chamber 81 and the first rubbish removal member 70 discharging rubbish from the first dust collection chamber 81, rubbish may be discharged to the outside through the discharge opening 68.

The main body 30 may include the rubbish separation device 51. The rubbish separation device 51 may include a cyclone. The rubbish separation device 51 may centrifuge rubbish not filtered in the first dust collection chamber 81 from air. Since the rubbish separation device 51 uses a different method, as compared to the filtering device 86, to separate rubbish from air which has passed through the filtering device 86, cleaning efficiency of the cleaner 1 according to one embodiment of the present disclosure can be improved.

The main body 30 may include the second rubbish removal member 75 provided to discharge rubbish from the second dust collection chamber 82. The second rubbish removal member 75 may be provided to slide in the second dust collection chamber 82 and the first dust collection chamber 81. The second dust collection chamber 82 may be formed between the first rubbish removal member 70 and the second rubbish removal member 75. The second rubbish removal member 75 may include a second mounting portion 76 and a second rubbish remover 77 mounted on the second mounting portion 76.

The second rubbish remover 77 may be configured to include an elastic material. While the main body 30 slides relative to the housing 20, the second rubbish remover 77 may slide in close contact with the inner side surface of the inner case 84 to discharge rubbish from the second dust collection chamber 82. While the main body 30 slides relative to the housing 20, the second rubbish remover 77 may slide in close contact with the inner side surface of the inner case 84 and completely empty the second dust collection chamber 82 of rubbish.

The main body 30 may include a second connector 79 configured to connect the first rubbish removal member 70 and the second rubbish removal member 75. The second connector 79 may be disposed in the second dust collection chamber 82. The second rubbish removal member 75 and the first rubbish removal member 70 may operate in conjunction with each other by the second connector 79.

The motor filter 46 may be provided in the main body 30. The motor filter 46 may be provided to filter rubbish one more time from air before the air is introduced into the fan motor unit 40. The motor filter 46 may be disposed in front of the fan motor unit 40 in a direction in which air which has passed through the rubbish separation device 51 is discharged. The motor filter 46 may be disposed between the fan motor unit 40 and the rubbish separation device 51. The motor filter 46 may filter rubbish from air which has passed through the rubbish separation device 51. The motor filter 46 may be provided as a mesh member.

The motor filter 46 may be detachably mounted in a filter case 47. The motor filter 46 may be disposed inside the housing 20 while mounted in the filter case 47. By the motor filter 46, the cleaner 1 according to one embodiment of the present disclosure can prevent damage to the fan motor unit 40 due to rubbish or the like and can discharge relatively clean air.

The main body 30 may include a shutter device 110 provided to open or close a flow path along which air which has passed through the motor filter 46 moves to the fan motor unit 40. The shutter device 110 will be described below.

The fan motor unit 40 may be provided to generate suction force in the first dust collection chamber 81 and the second dust collection chamber 82. Air which has passed through the motor filter 46 may pass through the fan motor unit 40 and then be discharged from the housing 20.

Referring to FIG. 2, the main body 30 of the cleaner 1 according to one embodiment of the present disclosure may include a first body 101 and a second body 102 detachably coupled to the first body 101. The first body 101 may include the handle 90, the extension 31, the battery mounting portion 32, and the fan motor unit 40. The second body 102 may include the opening/closing device 60, the first rubbish removal member 70, the second rubbish removal member 75, the rubbish separation device 51, and the filter case 47.

In the cleaner 1 according to one embodiment of the present disclosure, since the fan motor unit 40 which is relatively heavier than the battery 33 is disposed below the battery 33, the center of mass may be positioned relatively low. Accordingly, since the center of mass may be positioned relatively low, convenience of use of the cleaner 1 according to one embodiment of the present disclosure can be improved.

In the cleaner 1 according to one embodiment of the present disclosure, one portion of the main body 30 where the fan motor unit 40 is disposed may be provided to be partitioned from the battery mounting portion 32. That is, air flowing due to the fan motor unit 40 is immediately discharged through a motor exhaust port 41 and the exhaust ports 23 and 24 of the housing 20 without moving to the battery mounting portion 32 and the handle 90. Accordingly, the cleaner 1 according to one embodiment of the present disclosure can minimize the amount of discharged air heading toward a user.

A controller 36 may be disposed between the fan motor unit 40 and the battery mounting portion 32. The controller 36 may be provided as a printed board assembly (PBA). The controller 36 may be provided to control the operation of the cleaner 1.

According to the above-described configuration, in a case in which the cleaner 1 according to one embodiment of the present disclosure performs a cleaning operation, air including rubbish introduced from the suction head 10 may be primarily filtered in the filtering device 86 of the first dust collection chamber 81. Then, air which has moved to the rubbish separation device 51 through the case flow path 85 may be secondarily filtered. The air filtered in the rubbish separation device 51 may be collected in the second dust collection chamber 82. Air which has passed through the rubbish separation device 51 may be tertiarily filtered while passing through the motor filter 46 and then pass through the fan motor unit 40. The air which has passed through the fan motor unit 40 may be discharged through the motor exhaust port 41 and the exhaust ports 23 and 24 of the housing 20.

Referring to FIG. 6, when it is attempted to empty the rubbish collected in the dust collection chambers 81 and 82 after a cleaning task has ended, the user may slide the main body 30 relative to the housing 20. Here, the user may operate the button device 26 to move the main body 30.

While the main body 30 slides inside the housing 20, the opening/closing device 60 disposed on one end portion of the main body 30 opens the first dust collection chamber 81, the first rubbish removal member 70 slides on one surface of the filtering device 86 on which rubbish is present, and the second rubbish removal member 75 slides on an inner surface of the second dust collection chamber 82 and the one surface of the filtering device 86 on which rubbish is present. The first rubbish removal member 70 may separate the rubbish present on the filtering device 86 and discharge the separated rubbish to an outside of the first dust collection chamber 81. The second rubbish removal member 75 may, while discharging rubbish in the second dust collection chamber 82 to the outside, secondarily separate the rubbish present on the filtering device 86 and discharge the separated rubbish to the outside of the first dust collection chamber 81.

To this end, the first rubbish removal member 70 and the second rubbish removal member 75 may move to positions at which the first rubbish removal member 70 and the second rubbish removal member 75 protrude to the outside of the housing 20. On the other hand, the main body 30 may move so that only the opening/closing device 60 is exposed to the outside of the housing 20 and the first rubbish removal member 70 and the second rubbish removal member 75 are not exposed to the outside of the housing 20. Also, the main body 30 may move so that only the opening/closing device 60 and the first rubbish removal member 70 are exposed to the outside of the housing 20 and the second rubbish removal member 75 is not exposed to the outside of the housing 20.

Then, upon completion of discharge of dust from the dust collection chambers 81 and 82, the user may move the handle 90 of the main body 30 in a direction moving away from the housing 20, and accordingly, the opening/closing device 60 moves to a position closing the first dust collection chamber 81. Further, the button device 26 may fix the position of the main body 30 relative to the housing 20.

According to such a configuration, the cleaner 1 according to one embodiment of the present disclosure may easily empty rubbish from the dust collection chambers 81 and 82 by a relatively simple operation. Further, since the opening/closing device 60 is provided to open or close the dust collection chambers 81 and 82 only while rubbish is discharged from the dust collection chambers 81 and 82, scattering of rubbish can be prevented even when the housing 20 is separated from the suction head 10.

Figure 7:
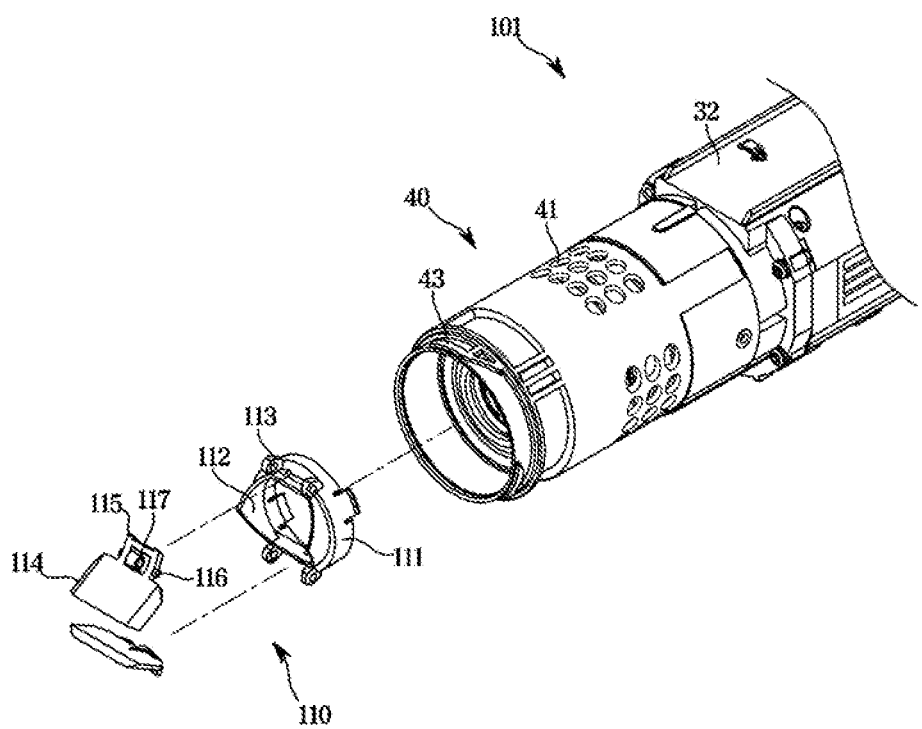
FIG. 7 is a view illustrating a state in which a shutter device illustrated in FIG. 5 is separated from a first body.
Figure 8:
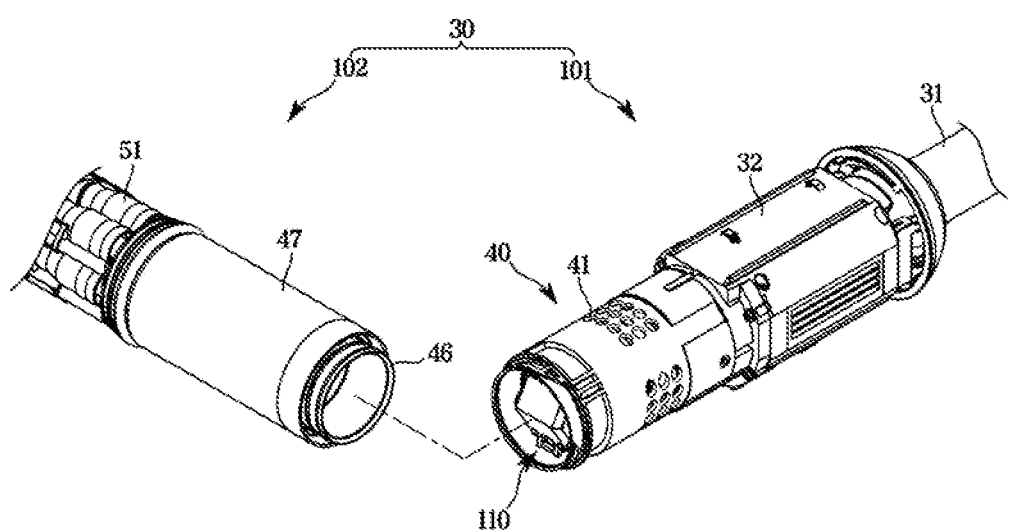
FIG. 8 is a view illustrating a state in which a second body having a motor filter illustrated in FIG. 5 mounted therein is coupled to the first body.
Figure 9:
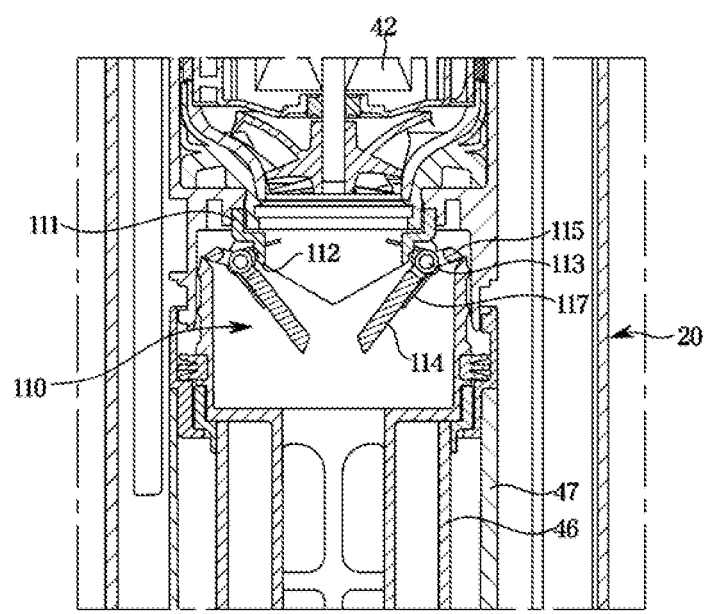
FIG. 9 is a view illustrating an operation of the shutter device when the second body illustrated in FIG. 8 is coupled to the first body.
Figure 10:
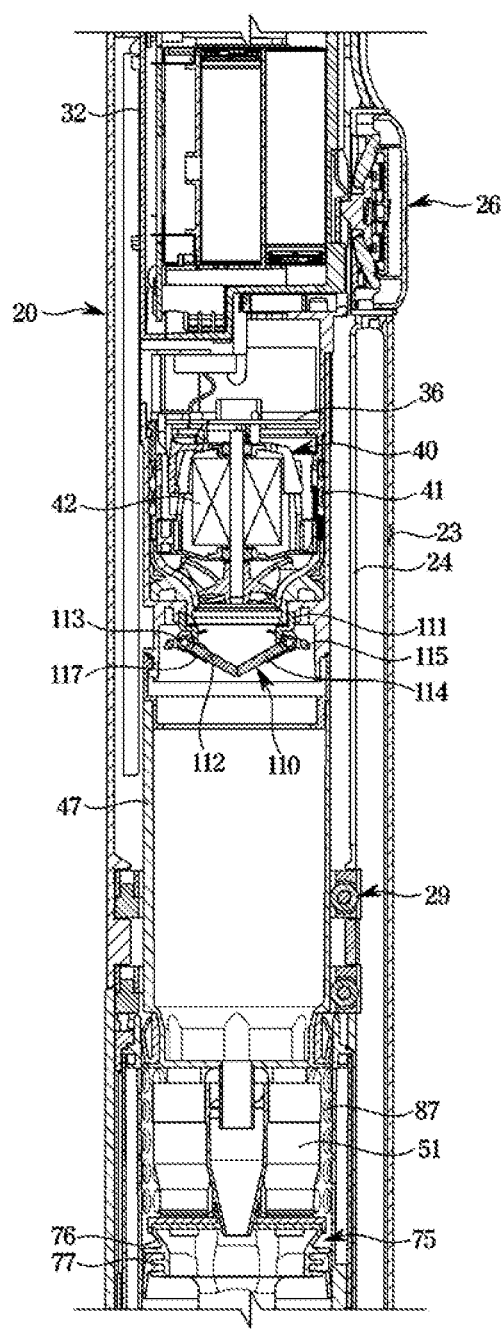
FIG. 10 is a view illustrating a state of the shutter device while the motor filter illustrated in FIG. 5 is not mounted in the main body.

FIG. 7 is a view illustrating a state in which a shutter device illustrated in FIG. 5 is separated from a first body. FIG. 8 is a view illustrating a state in which a second body having a motor filter illustrated in FIG. 5 mounted therein is coupled to the first body. FIG. 9 is a view illustrating an operation of the shutter device when the second body illustrated in FIG. 8 is coupled to the first body. FIG. 10 is a view illustrating a state of the shutter device while the motor filter illustrated in FIG. 5 is not mounted in the main body.

Referring to FIGS. 7 and 8, the shutter device 110 may be provided in the fan motor unit 40. The shutter device 110 may be provided to open or close a flow path between the motor filter 46 and the fan motor unit 40.

The shutter device 110 may be disposed on a coupling portion 43 coupled to the second body 102 of the fan motor unit 40. The second body 102 may be coupled to the coupling portion 43 of the fan motor unit 40 of the first body 101. The shutter device 110 may include a shutter body 111 and a shutter door 114 rotatably coupled to the shutter body 111.

The shutter body 111 may be mounted in the fan motor unit 40. The fan motor unit 40 may include a shutter opening 112. Air which has passed through the motor filter 46 through the shutter opening 112 may be introduced into the fan motor unit 40. The shutter opening 112 is provided to be opened or closed by the shutter door 114.

The shutter body 111 may include a door coupling portion 113 to which the shutter door 114 is rotatably coupled. The door coupling portion 113 may be provided to rotatably support the shutter door 114.

The shutter door 114 may be rotatably coupled to the shutter body 111. The shutter door 114 may be provided to open or close the shutter opening 112. The shutter door 114 may be provided as a pair of shutter doors 114.

The shutter door 114 may include a lever 115 protruding to be pressed by the motor filter 46. The lever 115 may be pressed when the second body 102 in which the motor filter 46 is mounted is mounted on the first body 101.

The shutter door 114 may include a door shaft 116 coupled to the door coupling portion 113. Since the door shaft 116 is rotatably coupled to the door coupling portion 113, the shutter door 114 may rotate relative to the shutter body 111 and open or close the shutter opening 112.

The shutter device 110 may include an elastic body 117 provided to support the shutter door 114 in a direction in which the shutter door 114 closes the shutter opening 112. The elastic body 117 may be provided as a torsion spring. Due to the elastic body 117, the shutter door 114 can keep the shutter opening 112 closed while the motor filter 46 does not press the lever 115.

Referring to FIGS. 8 and 9, according to such a configuration, in the cleaner 1 according to one embodiment of the present disclosure, the shutter door 114 may open the shutter opening 112 as the second body 102 in which the motor filter 46 is mounted is coupled to the first body 101. Specifically, a presser 46a provided on one end portion of the motor filter 46 that faces the fan motor unit 40 may press the lever 115 of the shutter door 114 when the second body 102 is coupled to the first body 101. As the lever 115 is pressed, the shutter door 114 may rotate in a direction in which the shutter door 114 opens the shutter opening 112. The user may apply a force greater than an elastic force of the elastic body 117 when coupling the second body 102 to the first body 101.

Accordingly, the second body 102 and the first body 101 may communicate.

On the other hand, referring to FIG. 10, in the cleaner 1 according to one embodiment of the present disclosure, in a case in which the second body 102 is coupled to the first body 101 while the motor filter 46 is not mounted in the second body 102, the shutter device 110 may keep the shutter opening 112 closed. That is, the shutter device 110 does not rotate in a direction in which the shutter device 110 opens the shutter opening 112, and accordingly, air including rubbish can be prevented from being introduced into the fan motor unit 40, and damage to the fan motor unit 40 can be prevented.

Further, conventionally, in order to check whether a filter is mounted, a separate sensor such as an infrared sensor or a Hall sensor has been applied, causing an increase in manufacturing costs and an increase in a product size due to a space occupied by the sensor. Also, in the case of a structure in which a main body 30 is provided to be movable relative to a housing 20 as in the cleaner 1 according to one embodiment of the present disclosure, there is a limit to the space for installing the separate sensor.

In the cleaner 1 according to one embodiment of the present disclosure, whether the motor filter 46 is mounted may be detected using the shutter device 110 having a relatively simple structure, without a separate sensor. Thus, manufacturing costs can be reduced, and a product size can be reduced by reducing a space occupied by a separate sensor.

Figure 11:
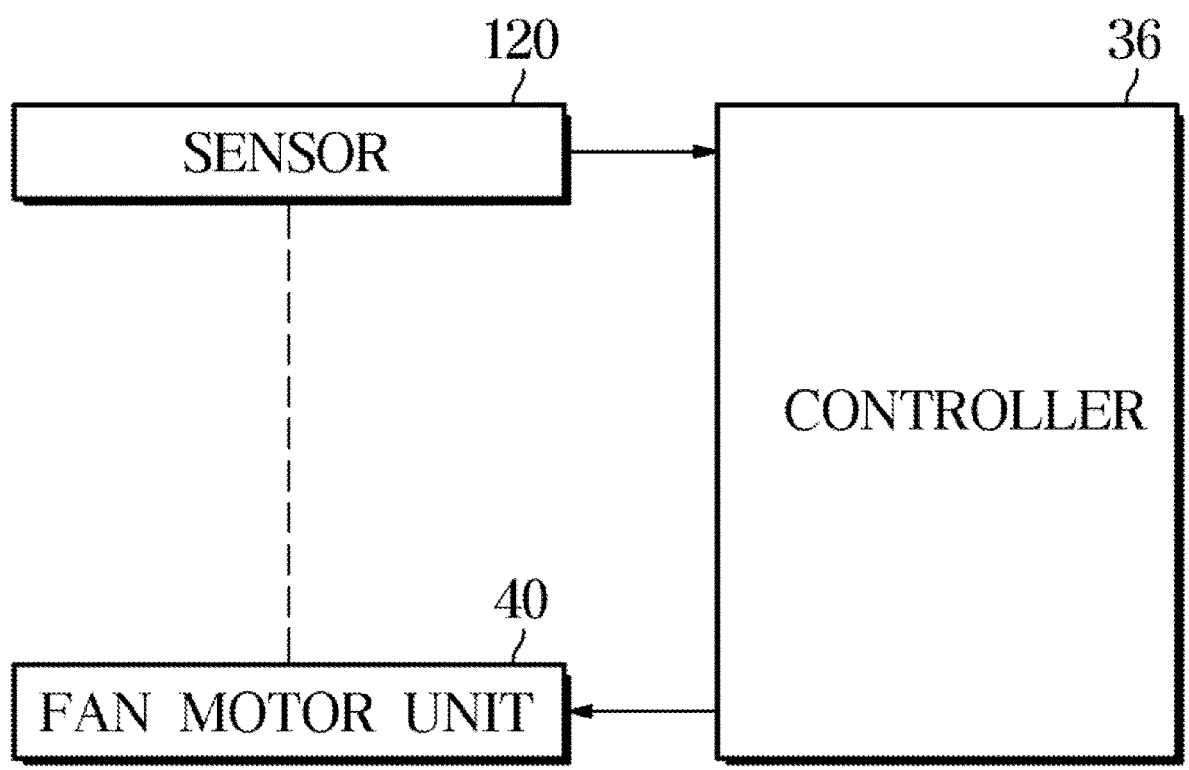
FIG. 11 is a control block diagram of the cleaner illustrated in FIG. 1.
Figure 12:
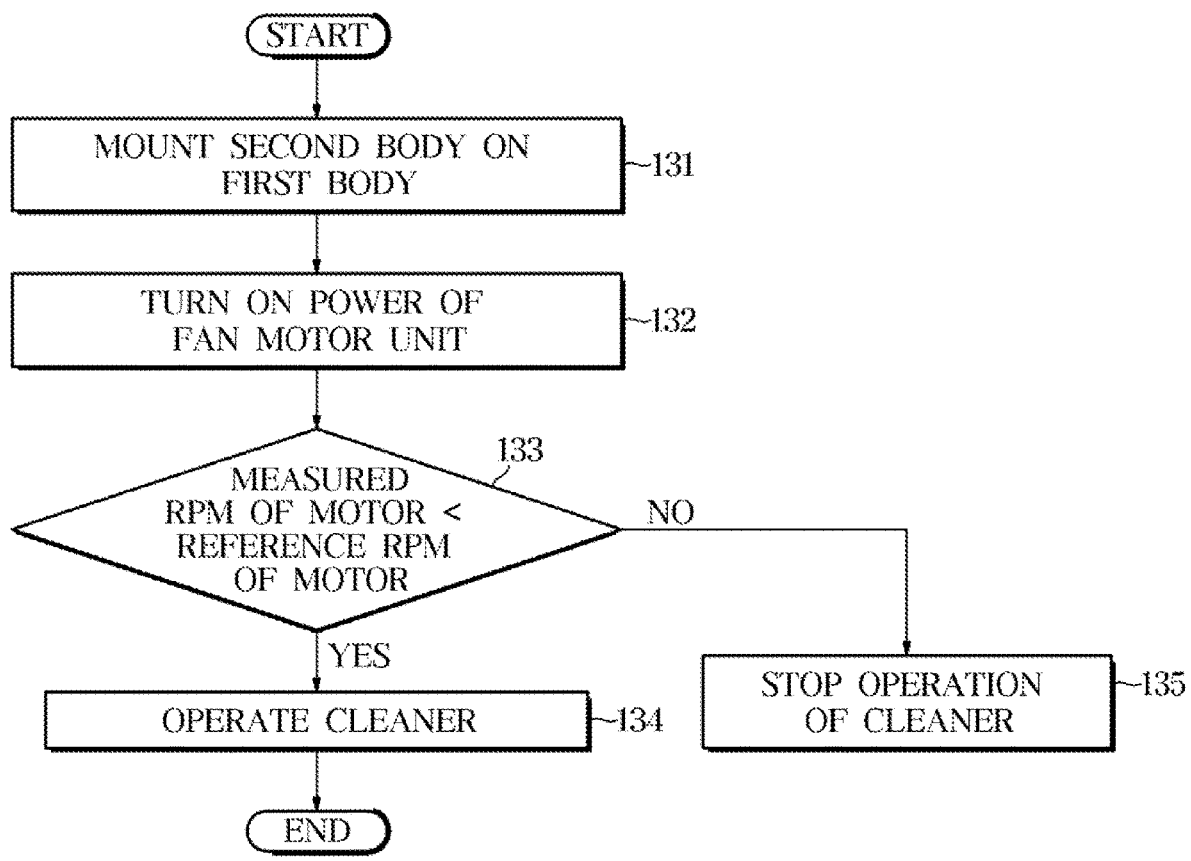
FIG. 12 is a flowchart illustrating a process in which the cleaner illustrated in FIG. 1 is selectively operated according to whether the motor filter is present which is detected by measuring a revolutions per minute of a fan motor.
Figure 13:
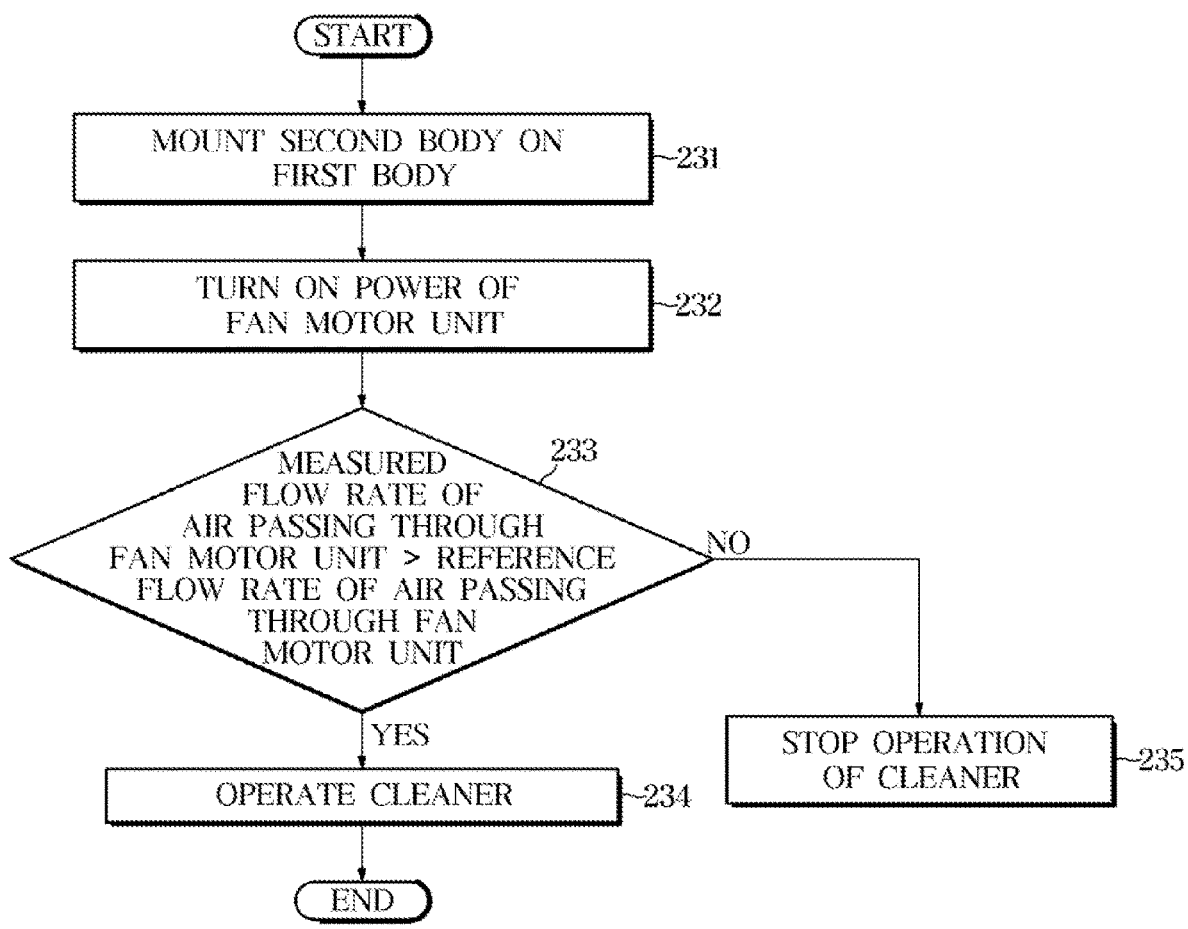
FIG. 13 is a flowchart illustrating a process in which the cleaner illustrated in FIG. 1 is selectively operated according to whether the motor filter is present which is detected by measuring a flow rate of air passing through a fan motor unit.
Figure 14:
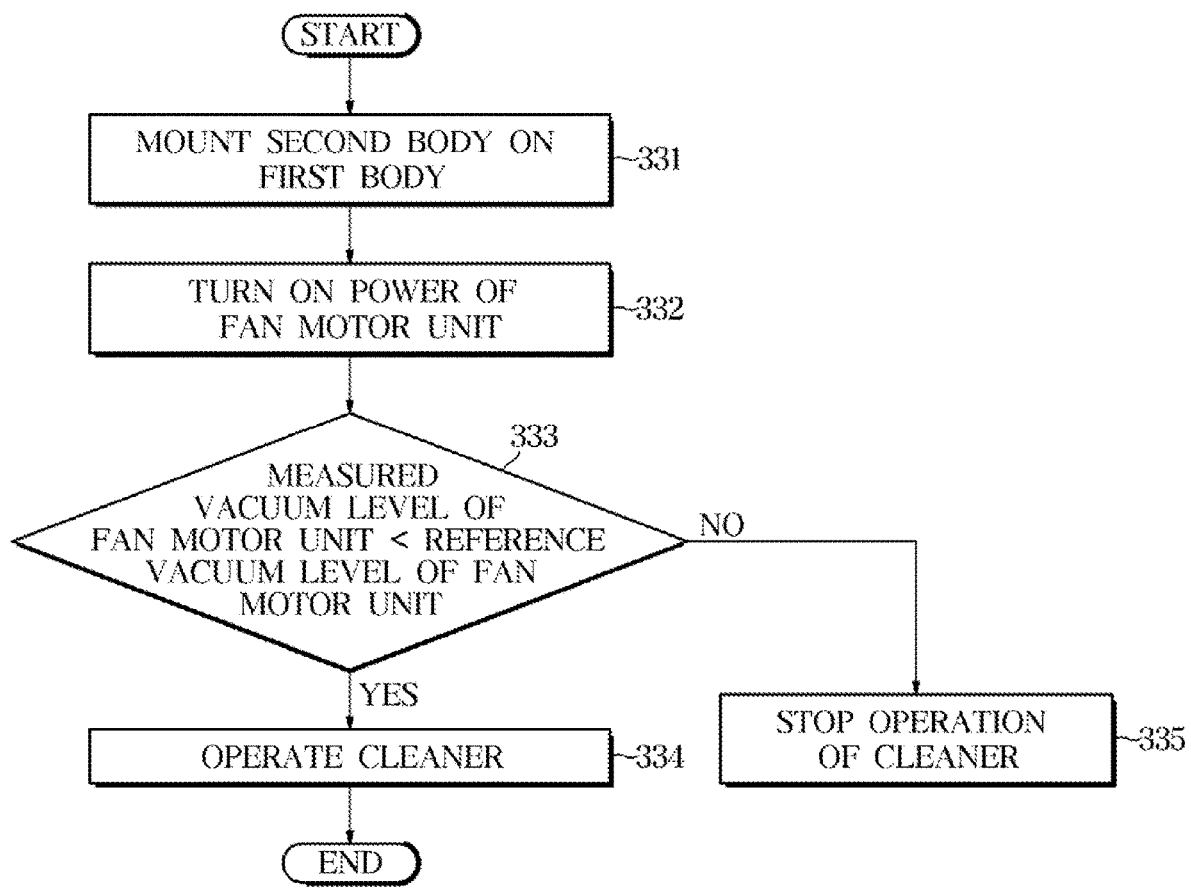
FIG. 14 is a flowchart illustrating a process in which the cleaner illustrated in FIG. 1 is selectively operated according to whether the motor filter is present which is detected by measuring a vacuum level inside the fan motor unit.

FIG. 11 is a control block diagram of the cleaner illustrated in FIG. 1. FIG. 12 is a flowchart illustrating a process in which the cleaner illustrated in FIG. 1 is selectively operated according to whether the motor filter is present which is detected by measuring a revolutions per minute of a fan motor. FIG. 13 is a flowchart illustrating a process in which the cleaner illustrated in FIG. 1 is selectively operated according to whether the motor filter is present which is detected by measuring a flow rate of air passing through a fan motor unit. FIG. 14 is a flowchart illustrating a process in which the cleaner illustrated in FIG. 1 is selectively operated according to whether the motor filter is present which is detected by measuring a vacuum level inside the fan motor unit.

Referring to FIG. 11, the cleaner 1 according to one embodiment of the present disclosure may include a sensor 120. The sensor 120 may be provided to detect whether the flow path between the motor filter 46 and the fan motor unit 40 is blocked.

Specifically, the sensor 120 may be provided to measure a revolutions per minute (RPM) of the fan motor 42 of the fan motor unit 40. In this case, the sensor 120 sends the measured RPM of the fan motor 42 to the controller 36. The controller 36 may control the operation of the fan motor unit 40 on the basis of information received from the sensor 120. Specifically, in a case in which the RPM of the fan motor 42 is higher than a reference RPM, the controller 36 may determine that the motor filter 46 is not mounted and stop the operation of the cleaner 1.

The sensor 120 may be provided to measure a flow rate of air passing through the fan motor unit 40. In this case, the sensor 120 sends the measured flow rate of air passing through the fan motor unit 40 to the controller 36. The controller 36 may control the operation of the fan motor unit 40 on the basis of information received from the sensor 120. Specifically, in a case in which the flow rate of air passing through the fan motor unit 40 is lower than a reference flow rate, the controller 36 may determine that the motor filter 46 is not mounted and stop the operation of the cleaner 1.

The sensor 120 may be provided to measure a vacuum level inside the fan motor unit 40. In this case, the sensor 120 sends the measured vacuum level inside the fan motor unit 40 to the controller 36. The controller 36 may control the operation of the fan motor unit 40 on the basis of information received from the sensor 120. Specifically, in a case in which the vacuum level inside the fan motor unit 40 is higher than a reference vacuum level, the controller 36 may determine that the motor filter 46 is not mounted and stop the operation of the cleaner 1.

The sensor 120 may be electrically connected to the controller 36. The controller 36 may be disposed on the other end of the fan motor unit 40 that is opposite to one end of the fan motor unit 40 where the shutter device 110 is disposed. The controller 36 may receive information from the sensor 120 and control the fan motor unit 40.

The operation of the cleaner 1 in a case in which the sensor 120 is provided to measure the RPM of the fan motor unit 40 will be described with reference to FIG. 12.

A user mounts the second body 102 on the first body 101 to clean a surface to be cleaned (131). The first body 101 is coupled to the housing 20, and specifically, the second body 102 is coupled to the first body 101 coupled to the housing 20.

The user operates the assembled cleaner 1. That is, the user may turn on the power of the fan motor unit 40 and operate the cleaner 1 (132).

While the fan motor unit 40 is operated, the sensor 120 measures the RPM of the fan motor 42. The sensor 120 sends a measured value to the controller 36.

The controller 36 which has received the RPM of the fan motor 42 compares the received value with a reference RPM of a motor (133).

In a case in which the measured RPM of the fan motor 42 is lower than the reference RPM, the cleaner 1 continues to operate (134).

Conversely, in a case in which the measured RPM of the fan motor 42 is higher than the reference RPM, the controller 36 stops the operation of the fan motor 42 of the cleaner 1 (135). That is, in the case in which the measured RPM of the fan motor 42 is higher than the reference RPM, the controller 36 may recognize a state in which the motor filter 46 is not mounted and stop the operation of the cleaner 1.

The operation of the cleaner 1 in a case in which the sensor 120 is provided to measure a flow rate of air passing through the fan motor unit 40 will be described with reference to FIG. 13.

A user mounts the second body 102 on the first body 101 to clean a surface to be cleaned (231). The first body 101 is coupled to the housing 20, and specifically, the second body 102 is coupled to the first body 101 coupled to the housing 20.

The user operates the assembled cleaner 1. That is, the user may turn on the power of the fan motor unit 40 and operate the cleaner 1 (232).

While the fan motor unit 40 is operated, the sensor 120 measures the flow rate of air passing through the fan motor unit 40. The sensor 120 sends a measured value to the controller 36.

The controller 36 which has received the flow rate of air passing through the fan motor unit 40 compares the received value with a reference flow rate of air passing through the fan motor unit 40 (233).

In a case in which the measured flow rate of air passing through the fan motor unit 40 is higher than the reference flow rate, the cleaner 1 continues to operate (234).

Conversely, in a case in which the measured flow rate of air passing through the fan motor unit 40 is lower than the reference flow rate, the controller 36 stops the operation of the fan motor unit 40 of the cleaner 1 (235). That is, in the case in which the measured flow rate of air passing through the fan motor unit 40 is lower than the reference flow rate, the controller 36 may recognize a state in which the motor filter 46 is not mounted and stop the operation of the cleaner 1.

The operation of the cleaner 1 in a case in which the sensor 120 is provided to measure a vacuum level of the fan motor unit 40 will be described with reference to FIG. 14.

A user mounts the second body 102 on the first body 101 to clean a surface to be cleaned (331). The first body 101 is coupled to the housing 20, and specifically, the second body 102 is coupled to the first body 101 coupled to the housing 20.

The user operates the assembled cleaner 1. That is, the user may turn on the power of the fan motor unit 40 and operate the cleaner 1 (332).

While the fan motor unit 40 is operated, the sensor 120 measures the vacuum level of the fan motor unit 40. The sensor 120 sends a measured value to the controller 36.

The controller 36 which has received the vacuum level of the fan motor unit 40 compares the received value with a reference vacuum level of the fan motor unit 40 (333).

In a case in which the measured vacuum level of the fan motor unit 40 is lower than the reference vacuum level, the cleaner 1 continues to operate (334).

Conversely, in a case in which the measured vacuum level of the fan motor unit 40 is higher than the reference vacuum level, the controller 36 stops the operation of the fan motor unit 40 of the cleaner 1 (335). That is, in the case in which the measured vacuum level of the fan motor unit 40 is higher than the reference vacuum level, the controller 36 may recognize a state in which the motor filter 46 is not mounted and stop the operation of the cleaner 1.

According to such configurations, the cleaner 1 according to one embodiment of the present disclosure allows whether the motor filter 46 is mounted to be checked with a relatively simple configuration. Further, in a case in which the motor filter 46 is not mounted, the operation of the cleaner 1 may be stopped to prevent damage to the cleaner 1.

Specific embodiments illustrated in the drawings have been described above. However, the present disclosure is not limited to the embodiments described above, and those of ordinary skill in the art to which the disclosure pertains may make various changes thereto without departing from the gist of the technical spirit of the disclosure defined in the claims below.

What is claimed is:

1. A cleaner comprising:
   a housing having a dust collection chamber formed in the housing and configured to open and close;
   a main body movable relative to the housing between a first position whereby the main body closes the dust collection chamber and a second position whereby the main body opens the dust collection chamber; and
   a motor filter mountable to and demountable from the main body,
   wherein the main body includes:
     a fan motor unit to generate a suction force and
     a shutter device mountable into the main body and configured to open or close a flow path between the motor filter and the fan motor unit.

2. The cleaner of claim 1, wherein the shutter device is configured to:
   open the flow path between the motor filter and the fan motor unit while the motor filter is mounted into the main body and
   close the flow path between the motor filter and the fan motor unit while the motor filter is demounted from the main body.

3. The cleaner of claim 1, wherein the shutter device includes:
   a shutter door; and
   an elastic body to support the shutter door at a position at which the shutter door closes the flow path between the motor filter and the fan motor unit.

4. The cleaner of claim 3, wherein the shutter door includes a lever to be pressed by the motor filter.

5. The cleaner of claim 1, wherein the main body includes a filter case couplable to and decouplable from the fan motor unit and the motor filter is mountable to and demountable from the filter case.

6. The cleaner of claim 1, further comprising:
a sensor to detect whether the flow path between the motor filter and the fan motor unit is blocked; and
a controller provided to receive information from the sensor and control the fan motor unit.

7. The cleaner of claim 6, wherein:
the fan motor unit includes a fan motor;
the sensor measures revolutions per minute of the fan motor; and
the controller is configured to stop the fan motor in response to the revolutions per minute of the fan motor measured by the sensor being higher than a predetermined revolutions per minute.

8. The cleaner of claim 6, wherein:
the sensor measures a flow rate of air passing through the fan motor unit; and
the controller is provided to stop the fan motor unit in response to the flow rate of the air measured by the sensor being lower than a predetermined flow rate.

9. The cleaner of claim 6, wherein:
the sensor measures a vacuum level inside the fan motor unit; and
the controller is configured to stop the fan motor unit in response to the vacuum level of the fan motor unit measured by the sensor being higher than a predetermined vacuum level.

10. The cleaner of claim 6, wherein the controller is disposed on one end of the fan motor unit that is opposite to another end of the fan motor unit where the shutter device is disposed.

11. The cleaner of claim 1, wherein the main body includes:
a rubbish removal member movable in the dust collection chamber; and
an opening/closing device to open or close the dust collection chamber and configured to operate in conjunction with the rubbish removal member.

12. The cleaner of claim 11, wherein:
the dust collection chamber is a first dust collection chamber;
the main body includes a rubbish separation device provided to remove rubbish from air which has passed through the first dust collection chamber; and
a second dust collection chamber in which rubbish separated from the rubbish separation device is collected inside the housing.

13. The cleaner of claim 12, wherein:
the rubbish removal member is a first rubbish removal member; and
the main body includes a second rubbish removal member to slide in the second dust collection chamber and the first dust collection chamber to discharge rubbish from the second dust collection chamber while the main body moves from the first position to the second position.

14. The cleaner of claim 12, wherein:
the rubbish separation device is disposed on one side of the motor filter; and
the fan motor unit is disposed on another side of the motor filter that is opposite to the one side.

15. The cleaner of claim 14, wherein:
the second dust collection chamber is disposed on a side of the rubbish separation device that is opposite to one side of the rubbish separation device where the motor filter is disposed; and
the first dust collection chamber is disposed on another side of the second dust collection chamber that is opposite to one side of the second dust collection chamber where the rubbish separation device is disposed.

* * * * *